I. D. L. OBERHOLTZER & E. MANN.
SPRING WHEEL.
APPLICATION FILED JAN. 11, 1913. RENEWED JUNE 28, 1916.
1,200,864.
Patented Oct. 10, 1916.
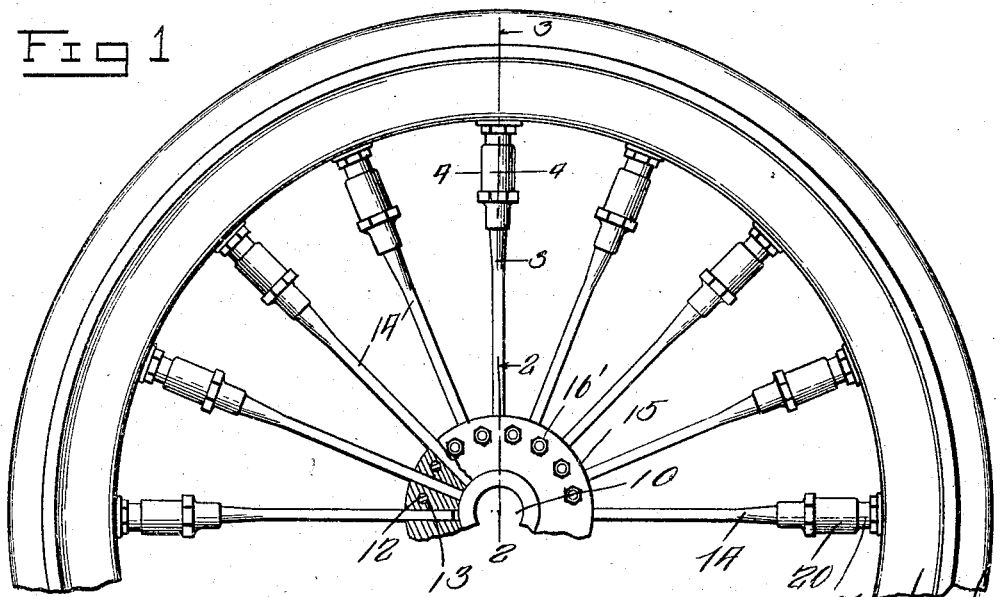
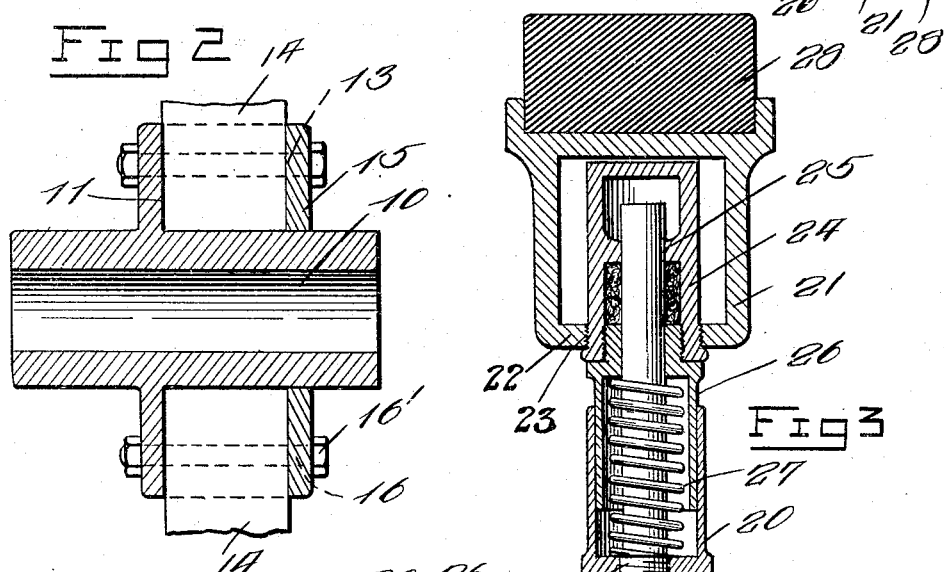
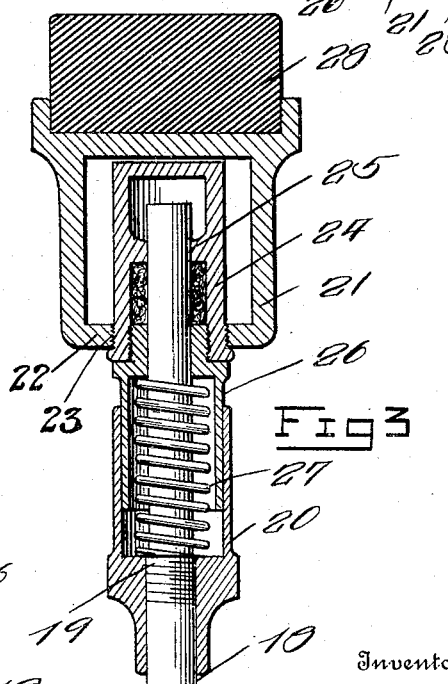
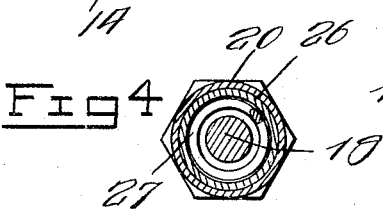
Inventors
I.D.L. Oberholtzer
E. Mann

UNITED STATES PATENT OFFICE.

ISAAC D. L. OBERHOLTZER AND EDWIN MANN, OF INDEPENDENCE, KANSAS; SAID OBERHOLTZER ASSIGNOR TO SAID MANN.

SPRING-WHEEL.

1,200,864. Specification of Letters Patent. Patented Oct. 10, 1916.

Application filed January 11, 1913, Serial No. 741,508. Renewed June 28, 1916. Serial No. 106,492.

*To all whom it may concern:*

Be it known that we, ISAAC D. L. OBERHOLTZER and EDWIN MANN, citizens of the United States, residing at Independence, in the county of Montgomery, State of Kansas, have invented certain new and useful Improvements in Spring-Wheels; and we do hereby declare the following to be a full, clear, and exact description of the invention, such as will enable others skilled in the art to which it appertains to make and use the same.

This invention relates to improvements in wheels, and particularly to spring wheels.

The principal object is to provide a simple spring wheel of such construction that the spokes will yield and may be readily removed therefrom.

Another object is to improve and simplify the construction of the outer ends of the spokes and their attachment to the felly.

Other objects and advantages will be apparent from the following description and with particular reference to the accompanying drawings.

In the drawings: Figure 1 is an elevation of a portion of my wheel made in accordance with my invention, Fig. 2 is a section on the line 2—2 of Fig. 1, Fig. 3 is an enlarged detail sectional view on the line 3—3 of Fig. 1, and Fig. 4 is a section on the line 4—4 of Fig. 1.

Referring particularly to the accompanying drawings, 10 represents the hub which is provided with an integral flange 11, this flange being provided with a plurality of openings 12 to receive the fastening bolts 13. Between these bolts are arranged the spokes 14 which will be referred to later. Disposed on the other end of the hub and against the spokes 14 is a disk 15 provided with a series of openings 16 to receive the ends of the bolts 13 and on which are applied the clamping nuts 16'. These spokes are formed of flat metal and are resilient, the outer ends being cylindrical in form, as indicated at 18, suitable threads 19 being formed thereon to receive a sleeve 20. The rim 21 is hollow and has its inner wall 22 formed with a plurality of threaded openings 23 to receive the externally threaded guiding sleeve 24. Within this sleeve 24 are guide lugs 25 which receive the end of the portion 18 of the spoke. Loosely mounted on the portion 18 of the spoke, and screwed into the inner end of the sleeve 24 is a sleeve 26 which telescopes within the sleeve 20. On the portion 18, within the sleeves 20 and 26 is a spring 27. A suitable tire 28 is secured to the rim 21.

What is claimed is:

In a spring wheel the combination with a rim having a threaded opening in the inner wall thereof, of a spoke socket including a guiding sleeve screwed into said opening, a second sleeve screwed into the guiding sleeve, a spoke, a third sleeve screwed onto the outer end portion of the spoke, the end portion of the spoke beyond the threaded portion extending through all of said sleeves and being guided in the first sleeve, said third sleeve receiving the second sleeve telescopically therein, and a coil spring on the said end portion of the spoke and within the second and third sleeves.

In testimony whereof, we affix our signatures, in the presence of two witnesses.

ISAAC D. L. OBERHOLTZER.
EDWIN MANN.

Witnesses:
J. N. MASTERS,
D. R. STOLFUS.